(12) United States Patent
Coon et al.

(10) Patent No.: US 8,095,829 B1
(45) Date of Patent: Jan. 10, 2012

(54) SOLDIER-ON MODE TO CONTROL PROCESSOR ERROR HANDLING BEHAVIOR

(75) Inventors: Brett W. Coon, San Jose, CA (US); Bryon S. Nordquist, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 648 days.

(21) Appl. No.: 11/934,730

(22) Filed: Nov. 2, 2007

(51) Int. Cl.
  G06F 11/00 (2006.01)
  G06F 11/07 (2006.01)
(52) U.S. Cl. .................. 714/38.13; 714/38.1; 714/2
(58) Field of Classification Search .......... 714/17, 714/35, 38, 38.1, 38.13, 2; 717/124, 131, 717/159
See application file for complete search history.

(56) References Cited

U.S. PATENT DOCUMENTS

| | | | | |
|---|---|---|---|---|
| 4,231,089 A * | 10/1980 | Lewine et al. | ........... | 714/6.32 |
| 4,486,826 A * | 12/1984 | Wolff et al. | ........... | 714/5.11 |
| 4,654,857 A * | 3/1987 | Samson et al. | ........... | 714/5.11 |
| 5,737,516 A * | 4/1998 | Circello et al. | ........... | 714/38.13 |
| 6,170,082 B1 * | 1/2001 | Demaray et al. | ........... | 717/127 |
| 6,247,172 B1 * | 6/2001 | Dunn et al. | ........... | 717/141 |
| 6,487,716 B1 * | 11/2002 | Choi et al. | ........... | 717/159 |
| 6,690,981 B1 * | 2/2004 | Kawachi et al. | ........... | 700/83 |
| 7,382,366 B1 * | 6/2008 | Klock et al. | ........... | 345/213 |
| 7,702,955 B2 * | 4/2010 | de Almeida et al. | ........... | 714/10 |
| 7,739,556 B1 * | 6/2010 | Duluk et al. | ........... | 714/49 |
| 2005/0229020 A1 * | 10/2005 | Goodman et al. | ........... | 714/2 |
| 2006/0048013 A1 * | 3/2006 | Barsness et al. | ........... | 714/38 |
| 2008/0133975 A1 * | 6/2008 | Pfeiffer et al. | ........... | 714/38 |
| 2008/0282111 A1 * | 11/2008 | Li et al. | ........... | 714/38 |

OTHER PUBLICATIONS

Stack Overflow, Runtime Error 202 by Vitalie Esanu version from Feb. 17, 2007 found via the WayBack Machine http://web.archive.org/web/*/http://www.esanu.name/delphi/Errors/Stack%20Overflow%20Runtime%20error%20202.html.*
Eggers, et al. "Simultaneous Multithreading: A Platform for Next-Generation Processors," *IEEE Micro*, vol. 17, No. 5, pp. 12-19, Sep./Oct. 1997.

* cited by examiner

*Primary Examiner* — Joseph Schell
(74) *Attorney, Agent, or Firm* — Patterson & Sheridan, LLP (57) ABSTRACT

A global processor operating mode is used select whether a processor stops processing when an error is detected or ignores the error and continues processing while overriding values as needed to recover from the error. When a soldier-on mode is enabled the system attempts to recover from the error while also recording the error state of the first error in on-chip registers for later analysis. When the soldier-on mode is not enabled and an error occurs, the system stops processing and the error is reported up to the operating system.

20 Claims, 8 Drawing Sheets

SOLDIER-ON MODE TO CONTROL PROCESSOR ERROR HANDLING BEHAVIOR

BACKGROUND OF THE INVENTION

1. Field of the Invention

Embodiments of the present invention relate generally to configuring a processor to continue processing while ignoring errors and, more particularly, to a global mode that controls whether the processor continues processing or stops processing when an error is detected.

2. Description of the Related Art

Current graphics program compilers detect errors in source files that are compiled. However, some errors cannot be detected or prevented by graphics program compilers, such as single bit errors in random access memories (RAMs), or data-dependent errors that only occur at runtime. More recently, graphics devices are configured to detect runtime errors, such as illegal operand values that are not caught by the compiler, and override the programmed state that causes an error using a default state to continue processing in a repeatable and predictable manner. However, overriding erroneous state with default values is only feasible for relatively minor errors, such as replacing a not-a-number (NaN) input value with a zero. For more serious errors, such as a branch to an illegal instruction address, safe default values for the specific error may not exist, in which case recovery requires much more state to be overridden to default values. During debug, it is preferable to stop processing when an error is detected in order to locate and fix the error.

Accordingly, what is needed in the art is a system and method for supporting the ability to debug runtime errors while allowing a processor to be configured to ignore and override runtime errors.

SUMMARY OF THE INVENTION

A global processor operating mode, called soldier-on mode, is used to select whether to stop processing when an error is detected or to ignore the error and continue processing and recover from the error. When a soldier-on mode is enabled the system attempts to recover from the error while also recording the error state of the first error in on-chip registers for later analysis. The soldier-on mode is used in production systems to minimize the impact of errors on the end-user. When the soldier-on mode is not enabled and an error occurs, the system stops processing and the error is reported up to the operating system, allowing for the error to be debugged during development.

Various embodiments of a method of the invention for controlling error handling behavior of a processing unit within a system include capturing error state information of the processing unit in an error information register, and determining if a soldier-on mode is enabled for the processing unit. The capturing is triggered by an error event signal indicating that a programming error has been detected by the processing unit. When the soldier-on mode is enabled the processing unit takes evasive action to override conditions causing the programming error in order to allow execution of a program to continue. When the soldier-on mode is not enabled, the processing unit stops execution of the program and asserts an interrupt to indicate that the error event has been detected by the processing unit.

Various embodiments of the invention for a computing device configured to execute programs include a front end monitoring unit that is coupled to a processing unit. The front end monitoring unit includes an error reporting unit that is configured to receive an error event signal and output an interrupt when a soldier-on mode is not enabled. The processing unit is configured to capture error state information in an error information register when the error event signal indicates that a programming error has been detected by the processing unit. The processing unit then determines if the soldier-on mode is enabled for the processing unit, takes evasive action to override conditions causing the programming error in order to allow execution of a program to continue when the soldier-on mode is enabled, and stops execution of the program when the soldier-on mode is not enabled.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
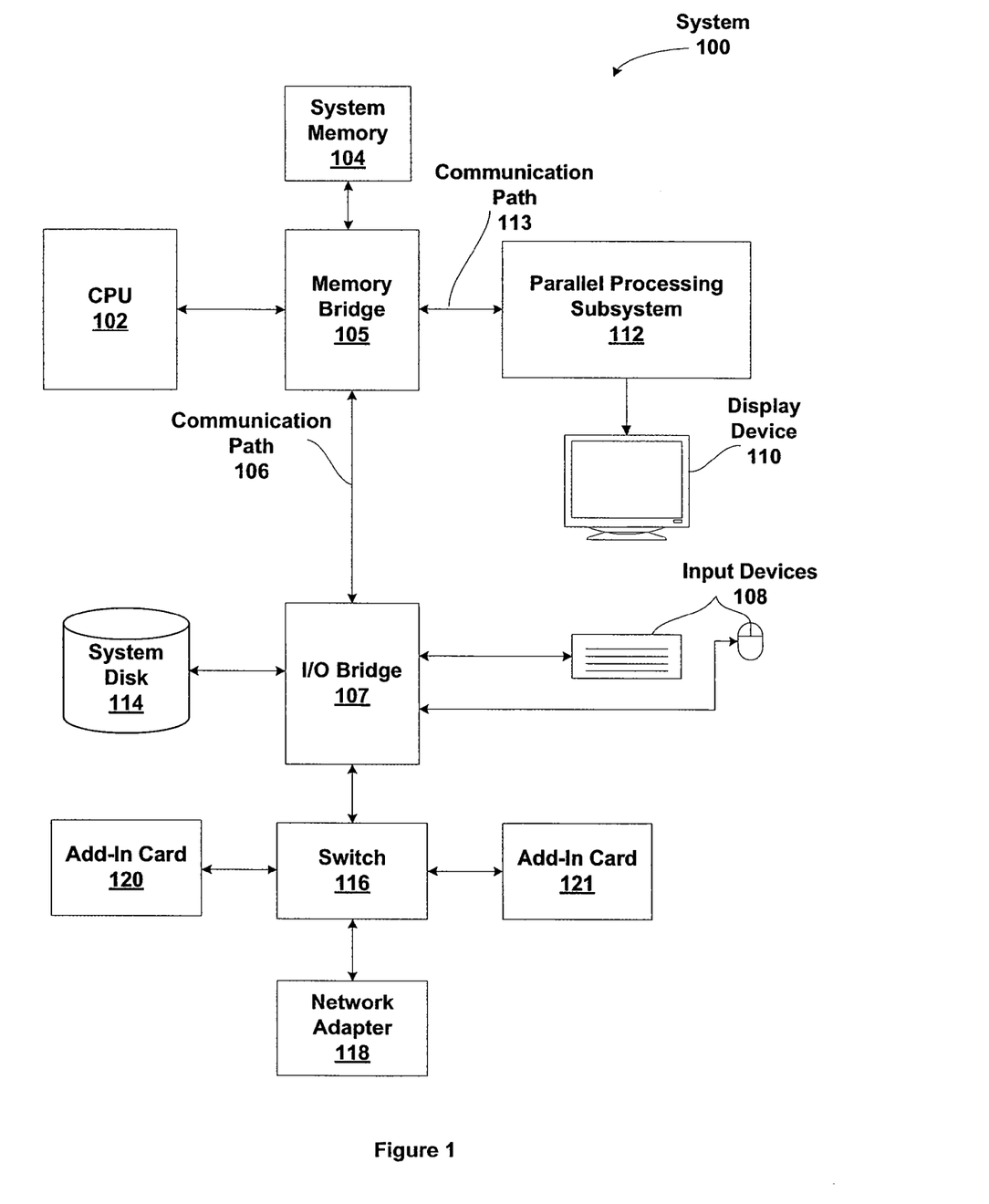
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU)

102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). Parallel processing subsystem 112 includes one or more processing devices that can be configured to perform graphics processing operations and execute graphics programs.

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

One or more devices within parallel processing subsystem 112 may be configured to support a global soldier-on mode that causes the device to ignore errors during processing when enabled. The device is configured to recover from any errors by overriding bad addresses, terminating threads, overriding illegal values, and the like, to continue processing. When the soldier-on mode is not enabled for a device, that device stops processing when a runtime error is encountered. Regardless of whether or not the soldier-on mode is enabled or not, the devices are configured to capture error state information to facilitate debugging of the error. When the soldier-on mode is enabled, the error state information for the first error is captured.

Figure 2:
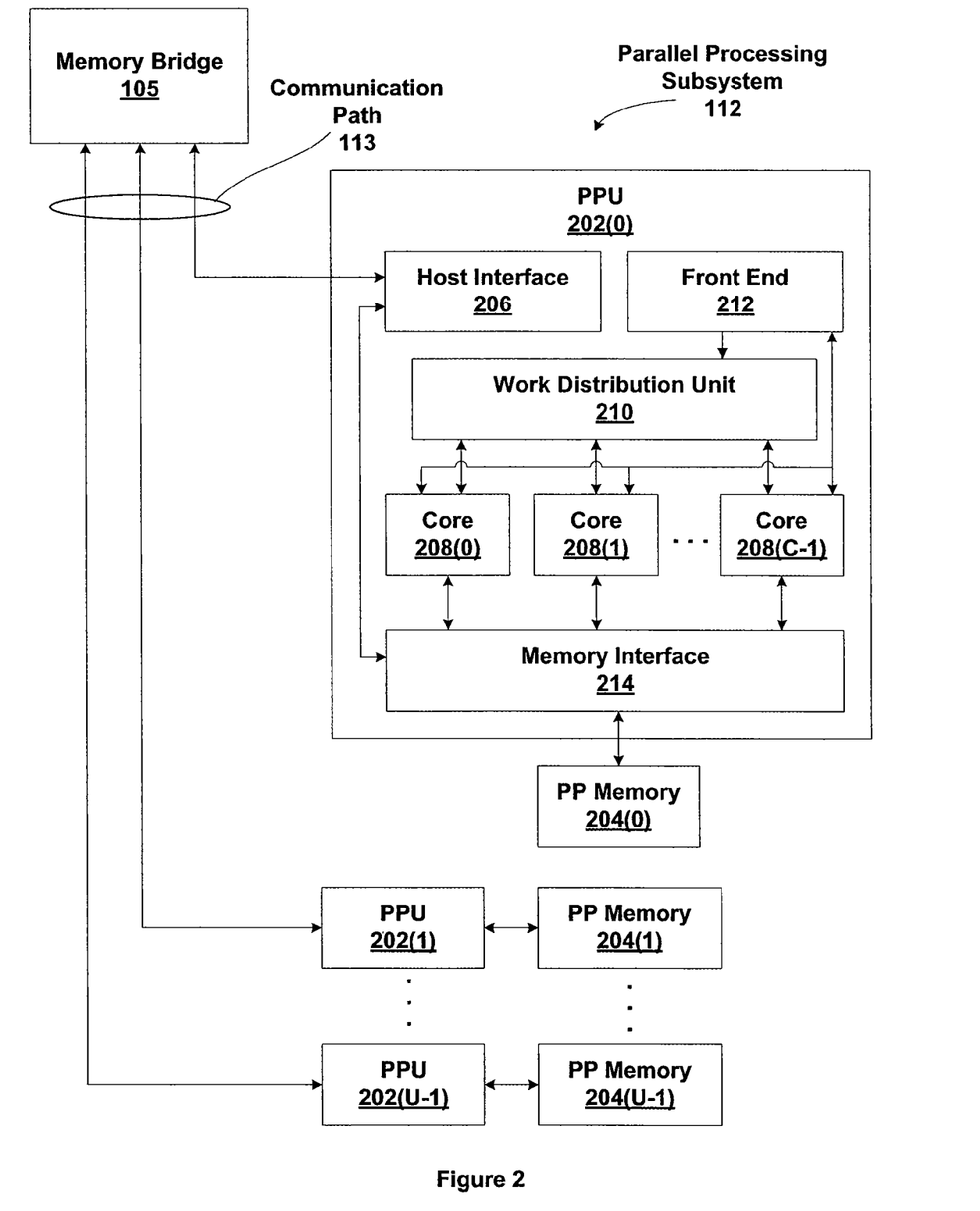
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with front end 212 to report errors and provide error state information to a device driver (not shown) that may be stored in system memory 104. Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs 202 may be identical or different, and each PPU 202 may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU. Systems incorporating one or more PPUs may be implemented in a variety of configurations and form factors, including desktop, laptop, or handheld personal computers, servers, workstations, game consoles, embedded systems, and so on.

Core Overview

Figure 3:
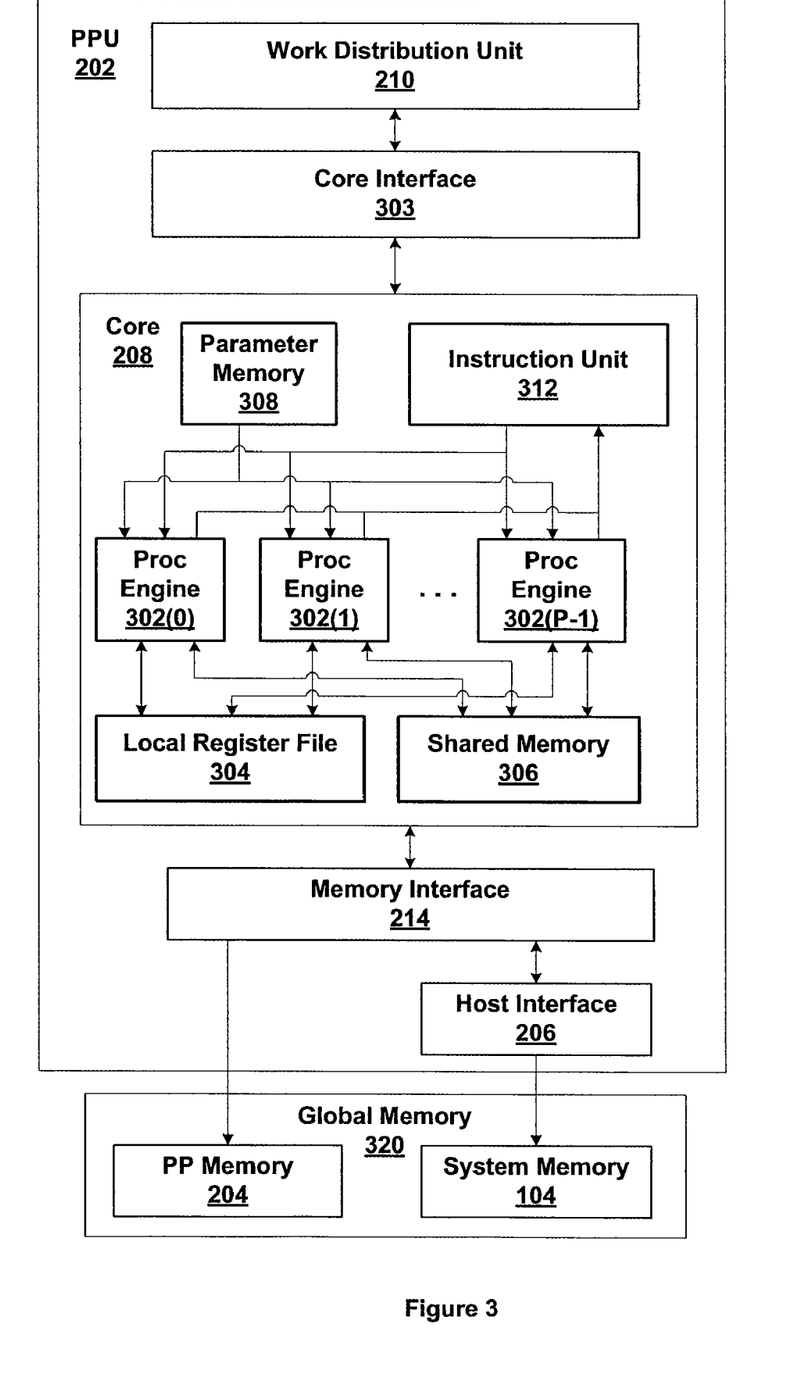
FIG. 3 is a block diagram of a parallel processing unit for the parallel processing subsystem of FIG. 2 in accordance with one or more aspects of the present invention.

FIG. 3 is a block diagram of a PPU 202 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multi-threaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Arrays and Cooperative Thread Arrays

In some embodiments, multithreaded processing core 208 of FIG. 3 can execute general-purpose computations using thread arrays. As used herein, a "thread array" is a group consisting of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are "cooperative" thread arrays, or CTAs. As with other types of thread arrays, a CTA is a group of multiple threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions of an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched.

In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

When a runtime processing error occurs, instruction unit 312 may be configured to store error state information, including a thread ID, program counter, memory address, register address, or the like. The program counter identifies the instruction of the program that was being executed when the error occurred. Examples of errors are memory addresses that are outside of the memory allocated to the PPU 202, illegal operands, invalid register addresses, popping an empty stack, pushing to a full stack, and the like, as described in conjunction with FIGS. 4 and 5.

Multithreaded Instruction Processing

Figure 4:
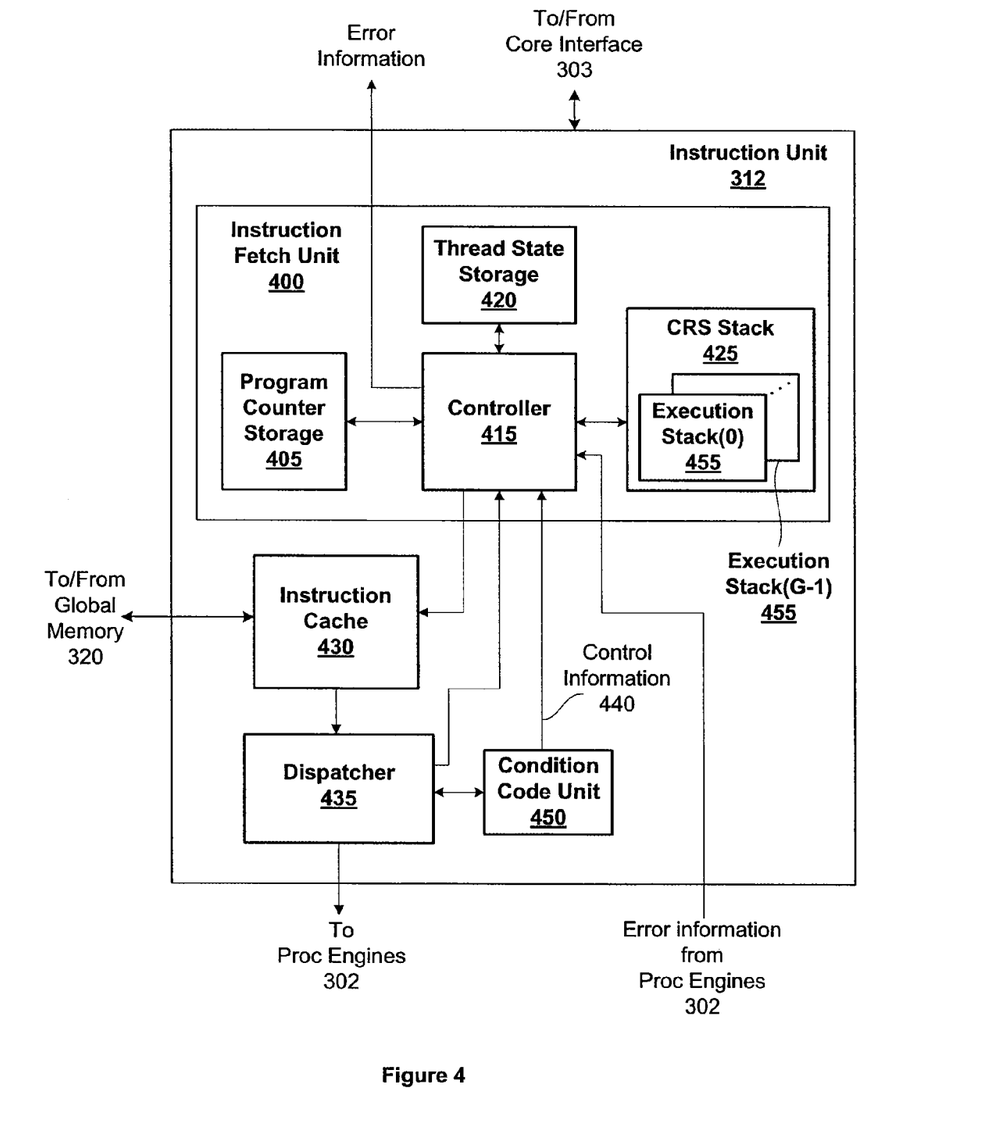
FIG. 4 is a block diagram of an instruction unit for the parallel processing unit of FIG. 3 in accordance with one or more aspects of the present invention.
Figure 5A:
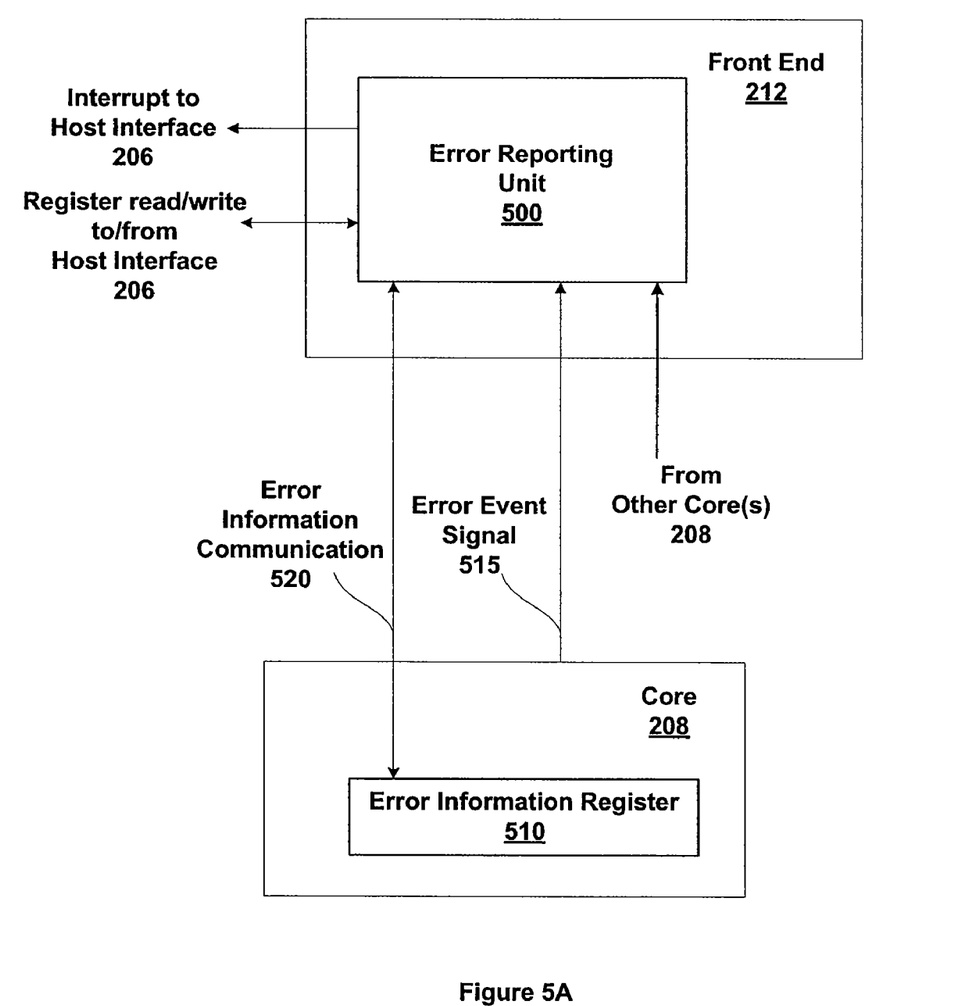
FIG. 5A is a block diagram of portions of the parallel processing unit of FIG. 3 that are used to communicate errors in accordance with one or more aspects of the present invention.
Figure 5B:
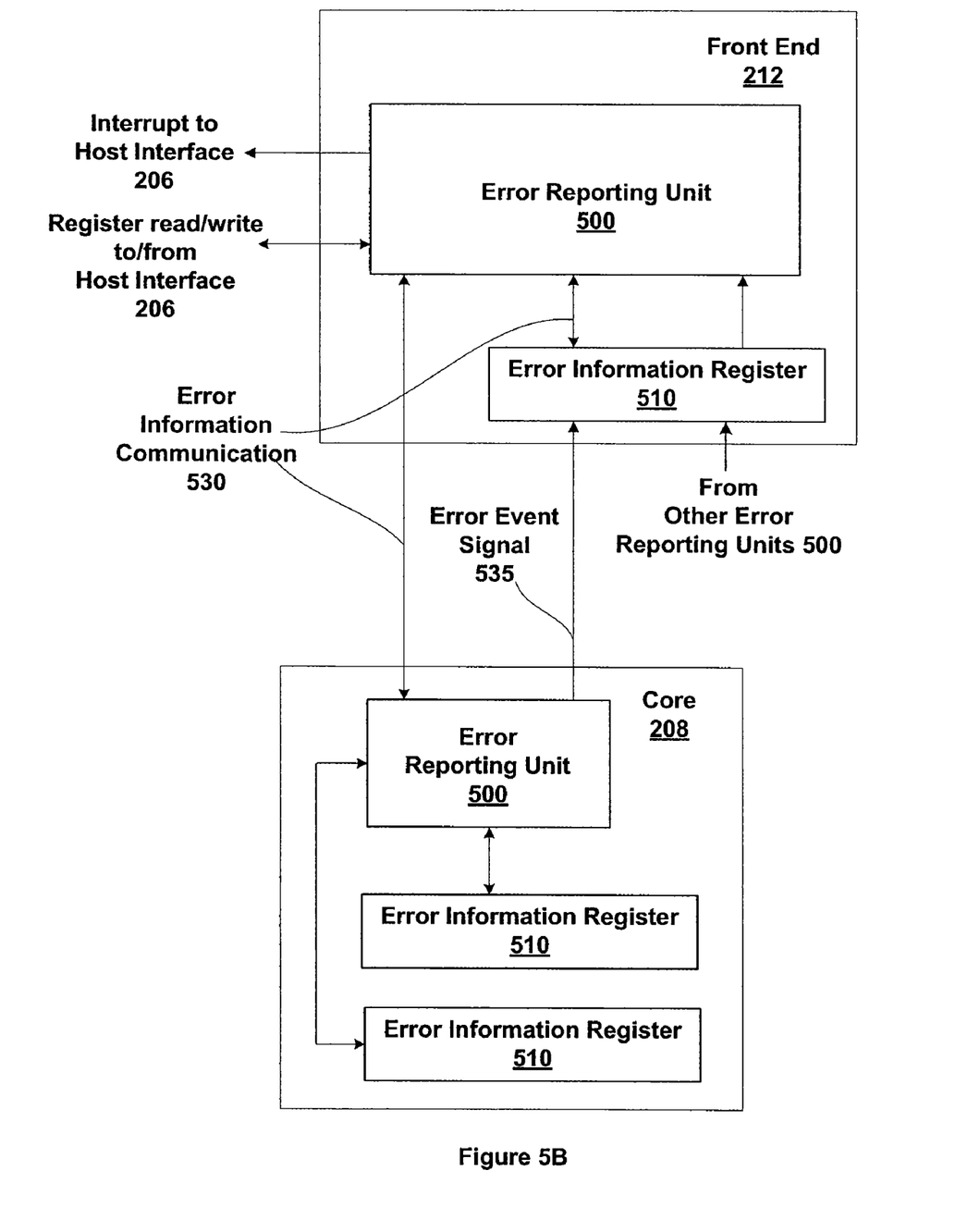
FIG. 5B is another block diagram of portions of the PPU of FIG. 2 that are used to communicate errors in accordance with one or more aspects of the present invention.

FIG. 4 is a block diagram of instruction unit 312 for the parallel processing unit 202 of FIG. 3, in accordance with one or more aspects of the present invention. Instruction unit 312 includes an instruction fetch unit 400, instruction cache 430, dispatcher 435, and condition code unit 450. Instruction fetch unit 400 receives data to be processed and a program identifier corresponding to a program that should be used to process the data. A program counter storage 405 stores the active program counter, indicating the next program instruction (INSTR) that should be executed for each SIMD thread group. When G=24, program counter storage 405 stores 24 active program counters. Similarly, thread state storage 420 stores an active mask for each SIMD thread group, where each bit of the active mask corresponds to an integer number of the P, processing engines 302. Therefore, the number of bits in the active mask is the number of threads in a SIMD thread group. Thread state storage 420 also stores a disable mask for each SIMD thread group. The disable mask includes a flag for each one of the threads in the SIMD thread group. The flag indicates if a thread is enabled, disabled for the processing of a conditional return instruction, disabled for the processing of a conditional break instruction, or if the thread has exited the program.

CRS (call, return, synchronization) stack 425 includes an execution stack for each SIMD thread group, shown as execution stacks (0) through (G-1) in FIG. 4. The execution stacks are used during control instruction processing to push and pop tokens that include state information, e.g., token type, token program counter, and token mask. In some embodiments of the present invention, CRS stack 425 may spill entries to global memory 320 for any execution stacks 455 that overflow and restore spilled entries when space is available in CRS stack 425. However, when controller 415 attempts to push a token onto an execution stack 455 that exceeds the maximum number of stack entries, runtime execution error occurs. Conversely, when controller 415 attempts to pop a token from an execution stack 455 that is empty, a runtime execution error occurs. Controller 415 provides error information to front end 212.

Controller 415 pushes and pops entries from CRS stack 425 as control instructions are executed. In one embodiment, there are six types of control instructions: conditional branch instructions, call instructions, PreBreak instructions, PreReturn instructions, conditional return instructions, synchronization instructions, and conditional break instructions. Alternative embodiments may include more or fewer types of control instructions as well as different types of control instructions.

Controller 415 provides an active program counter and active mask for a SIMD thread group to instruction cache 430. Instruction cache 430 obtains the instruction corresponding to the active program counter and outputs the instruction and active mask to dispatcher 435. Instruction cache 430 reads the instructions from global memory 320 as needed, using caching techniques known to those skilled in the art. Controller 415 receives control information from condition code unit 450 via control information 440 when a control instruction is executed. The control information includes a token type indicating the type of control instruction, a stack unwind signal, and other data needed to push tokens onto CRS stack 425 and update the active mask and disable mask for the SIMD thread group.

Dispatcher 435 decodes the instruction and provides error information to controller 415 when the instruction is an illegal command or when a register or memory address is out of bounds. Dispatcher 435 also outputs conditional data for any conditional control instructions (conditional branch, conditional break, and conditional return) to condition code unit 450. The conditional data includes the condition test and the comparison value (specified by the control instruction) to which the condition code is applied. Conventionally condition codes are used to evaluate the condition test specified by the instruction for a comparison value to produce a true or false result. Six of the eight condition tests for integer values are conventional condition tests, e.g., less than (LT), equal (EQ), greater than (GT), less than or equal (LE), greater than or equal (GE), and not equal (NE). The condition tests are used to determine whether the comparison value is positive, zero, or negative.

When floating point format values are used, the condition tests may also include condition tests that define the behavior for unordered values, such as NaN (not-a-number) values. A NaN does not have an order relative to numeric values, and therefore, can yield unexpected results when used to produce a comparison value or as the input for a conventional condition test. Eight new condition tests, e.g., LEG, U, LTU, EQU, LEU, GTU, NEU, and GEU, provide for explicit handling of NaN values. LEG (less than, equal, or greater than) is only true when the comparison value is zero, positive, or negative, i.e., ordered. U (unordered) is only true when the comparison value is unordered, i.e., NaN. LTU (less than zero or unordered) is true when the comparison value is negative or NaN. EQU (equal to zero or unordered) is only true when the comparison value is zero or NaN. LEU (less than or equal to zero or unordered) is only true when the comparison value is negative, zero, or NaN. GTU (greater than zero or unordered) is only true when the comparison value is positive or NaN. NEU (not equal to zero or unordered) is only true when the comparison value is positive, negative, or NaN. GEU (greater than or equal to zero or unordered) is only true when the comparison value is positive, zero, or NaN.

The other two conventional condition tests (for integer and floating point values) are always (TR) and never (FL). Additional condition tests, such as overflow and carry, may also be used and the number of condition tests is increased accordingly. The comparison value may be computed during execution of the program and each thread in the SIMD thread group may have a comparison value. Therefore, some threads may produce a true result while others produce a false result, when the condition test is evaluated. When one or more active threads produce a different condition test result than other active threads, the threads diverge and CRS stack 435 is used to store a token including an active mask and program counter for the side of the branch that will be executed after a first side of the branch has completed execution.

In addition to the conditional data, dispatcher also outputs the control instruction (call, break, return, branch, or the like), any target program counter (address) specified by the instruction, and active mask to condition code unit 450. Control instructions are not output to processing engines 203 by dispatcher 435. Instead, condition code unit 450 determines a "taken" mask based on the active mask that is included in the control information output to controller 415 by condition code unit 450. Specifically, condition code unit 450 uses the condition test result to determine a "taken mask" that indicates the active threads which evaluate to TRUE for the condition test specified by the instruction. Bits of the taken mask that correspond to threads in the SIMD thread group that correspond to a true comparison test result are cleared. The active mask and taken mask may be used by controller 415 to update the disable mask.

Condition code unit 450 outputs the taken mask and token type to controller 415 via control information 440. When a target program counter is specified by a call or branch control instruction, the taken program counter is output by condition code unit 450 to controller 415 via control information 440.

The token type indicates the type of control instruction that was executed to produce the disable mask. Token types include: sync, call, diverge, and break. Note, that when a control instruction for a thread is in-flight, i.e., output by controller 415 and not yet received by controller 415 via control information 440, another instruction for the same thread should not be output by controller 415.

Other instructions (non-control instructions), received by dispatcher 435 are queued for output to processing engines 302. Dispatcher 435 may be configured to output instructions based on the availability of (computational or storage) resources that are needed to process the instruction. In some embodiments of dispatcher 435, a scoreboarding scheme is used to track resource availability and determine which instructions can be output to processing engines 302. When processing engines 203 receive an instruction, a read request is generated to obtain any operands that are needed to execute the instruction and the read request is output to LRF 304 or shared memory 306. The instruction is then processed by processing engines 302 when the operands have been obtained. When processing engines 302 receive illegal operands, such as NaNs, processing engines 302 provide error information to controller 415.

Soldier-On Mode

FIG. 5A is a block diagram of portions of the PPU 202 of FIG. 2 that are used to communicate errors, in accordance with one or more aspects of the present invention. A hardware warning protocol provides a systematic mechanism for detecting and reporting error events during execution of a program. Core 208 includes an error information register 510. Core 208 may also include other subunits, as previously described that are not shown in FIG. 5. Core 208 is configured to detect an error event and trigger error state register 300 to store the error state. An error state is an illegal operating state, where an operating state is defined as the data stored in registers and memory resources of core 208 and the pending instruction. An error event is an error state occurring at a particular point in time. Core 208, for any given unique error state, responds in a defined manner that is identical for each such error event to support the default error handling behavior. For example, when an illegal register operand in an instruction is detected (an error event), the instruction is treated as a NOP (no operation).

Capturing all or at least a portion of the error state in error information register 510 permits debugging of the program that caused the error at a later time, such as after an image is rendered. Since each core 208 within PPU 202 includes an error information register 510, the hardware error reporting protocol is systematic and consistent. Host interface 206 is configured to access error information register 510 via front end 212 to enable error information register 510 to capture error state information, read error information register 510 during debug, and reset error information register 510 to clear the error state information. Host interface 206 may also enable or disable the interrupt output by error reporting unit 500.

Core 208 outputs an error event signal 515 to error reporting unit 500 within front end 212. Error event signal 515 indicates whether or not an error event has occurred. As shown in FIG. 5, additional error information and error event signals from other cores 208 is provided to error reporting unit 500. Error state information stored in error information register 510 may be read, written, or reset through an interface between error reporting unit 500 and error information register 510, via error information communication 520. Error state information is captured for the first error event regardless of whether the soldier-on mode is enabled or disabled for PPU 202.

FIG. 5B is another block diagram of portions of PPU 202 of FIG. 2 that are used to communicate errors, in accordance with one or more aspects of the present invention. In this embodiment of PPU 202, multiple error information registers 510 and multiple error reporting units 500 are configured in a daisy-chain, such that a lower-level error reporting unit 500 reports an error into a higher-level error information register 510. The error received from the lower-level error reporting unit 500 via error event signal 535 is collected along with other errors from other lower-level error reporting units 500 and summarized to the next higher error reporting unit 500. Each error information register 510 records only the first error that it detects, even when that error is not the first (or only) error detected in PPU 202. Thus, to identify the first error encountered, host interface 206 queries the multiple error information registers 510 in reverse (highest-level to lowest-level) order via error information communication 530.

Figure 6A:
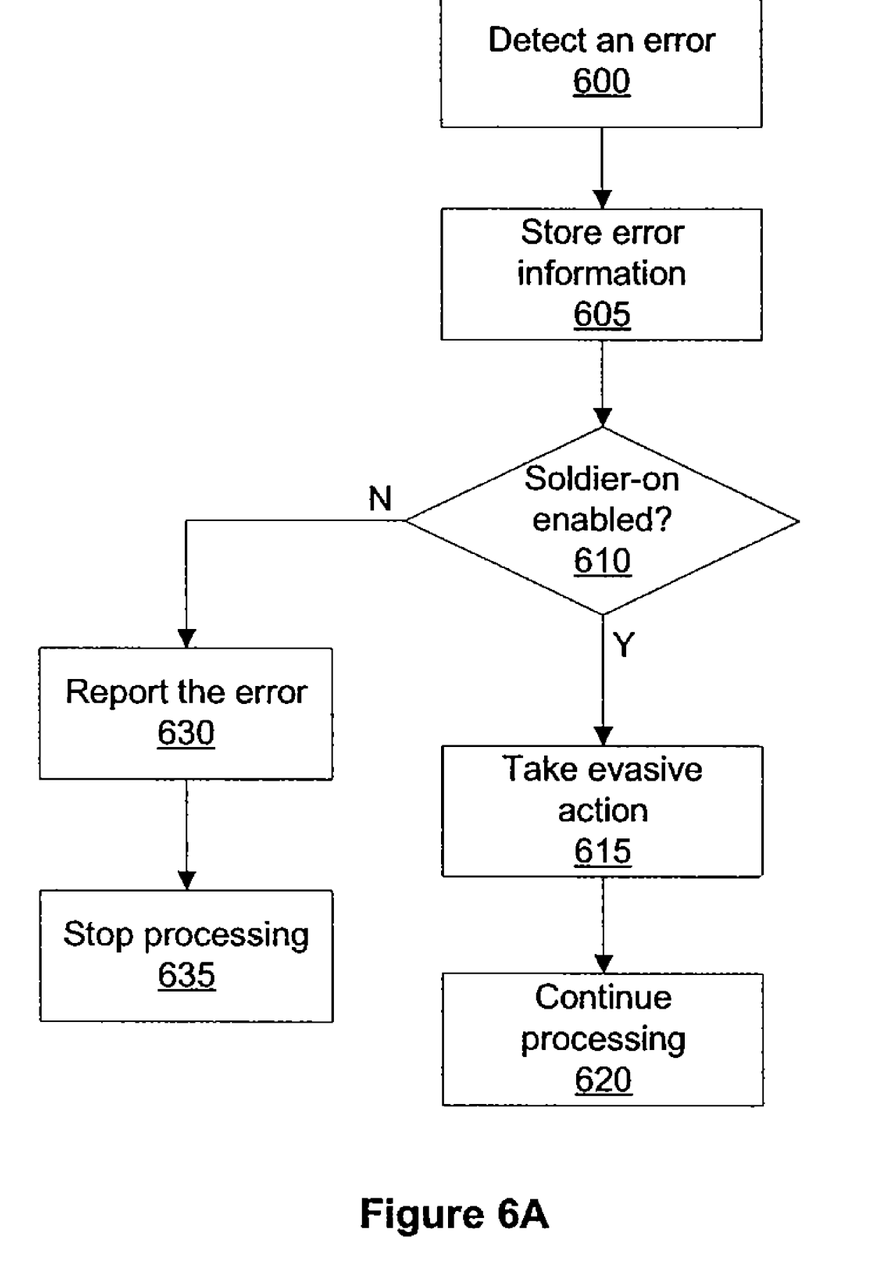
FIG. 6A is a flow diagram of method steps for handling errors when the soldier-on mode is enabled or disabled in accordance with one or more aspects of the present invention.

FIG. 6A is a flow diagram of method steps for handling errors when the soldier-on mode is enabled or disabled, in accordance with one or more aspects of the present invention. In step 600 an error event is detected. In step 605 the error state information is stored in error information register 510. In step 610 core 208 determines if the soldier-on mode is enabled, and, if not, then in step 630 error reporting unit 500 signals an interrupt to host interface 206 in order to report the error. In step 635 PPU 202 stops processing. In some embodiments of the present invention, the error reporting mechanism is enabled and disabled independent of the soldier-on mode.

Figure 6B:
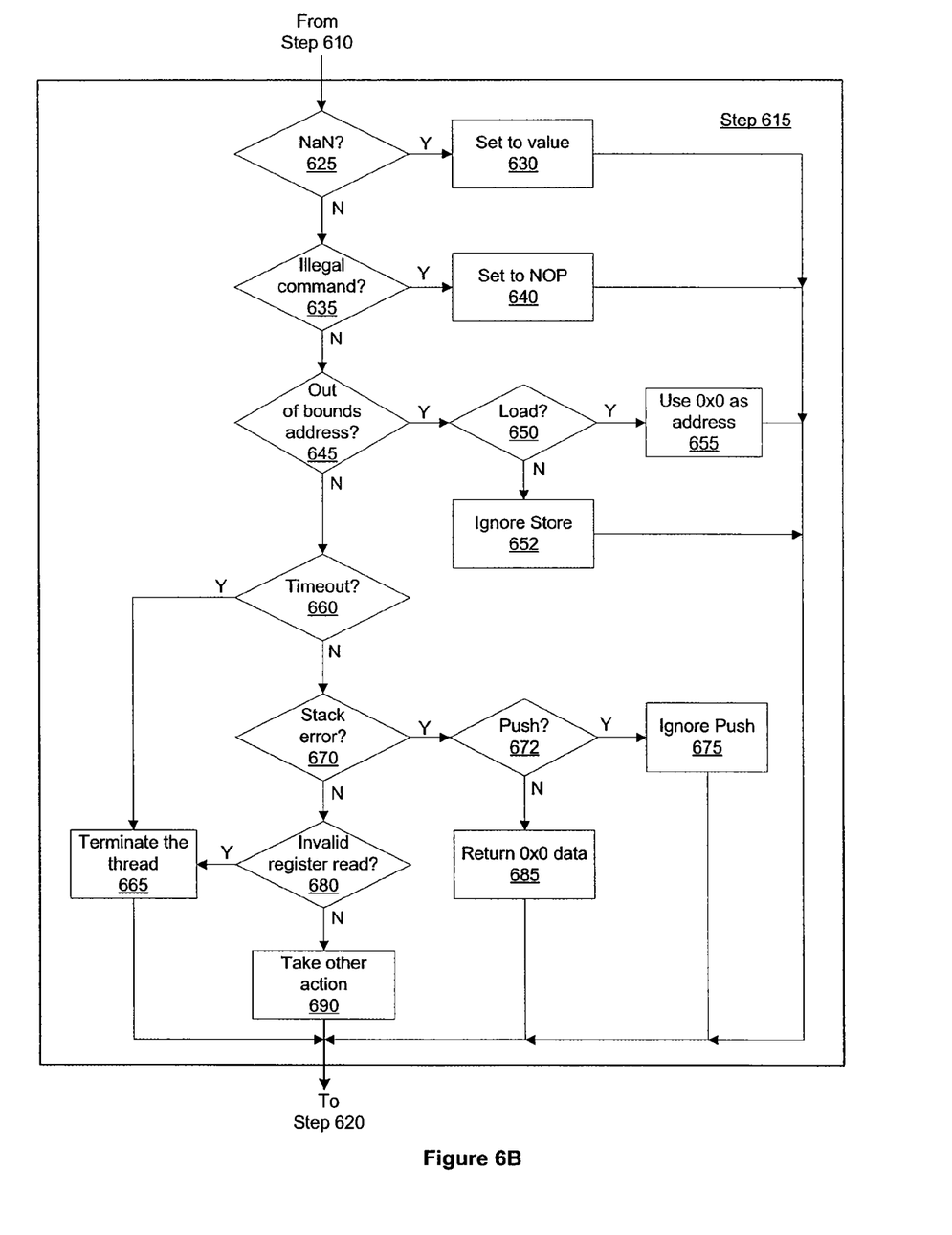
FIG. 6B is a flow diagram of one of the method steps of FIG. 6A in accordance with one or more aspects of the present invention.

If, in step 610, core 208 determines that the soldier-on mode is enabled, then in step 615 core 208 takes evasive action in order to override conditions causing the programming error in order to allow execution of a program to continue, as described in conjunction with FIG. 6B. In step 620 PPU 202 continues processing in order to minimize the negative impact on the user.

FIG. 6B is a flow diagram of step 615 of FIG. 6A, in accordance with one or more aspects of the present invention. Additional steps may be included in step 615 to perform evasive actions for other types of error events. Furthermore, the evasive action for the error events shown in FIG. 6B may vary for other embodiments of the present invention. In step 625 dispatcher 435 determines if a NaN value is provided as an operand for an instruction, and, if so, in step 630 dispatcher 435 overrides the operand by setting the operand to a particular value, such as zero, before proceeding to step 620. If, in step 625 dispatcher 435 determines that a NaN value is not provided as an operand, then in step 635, dispatcher 435 determines if an illegal command is used. If an illegal command is used, in step 640 dispatcher 435 overrides the command by setting the command to a NOP (no operation) before proceeding to step 620.

If dispatcher 435 determines that an illegal command is not used, then in step 645 dispatcher 435 determines if a memory address, e.g., shared memory 306 or PP memory 204 is outside of the physical address space of shared memory 306 or allocated to PPU 202. Note that virtual addresses are converted into physical addresses within PPU memory 204. If, in step 645 dispatcher 435 determines that a memory address is out of bounds, then in step 650 dispatcher 435 determines if the command is a load command. If the command is a load command, then in step 655 dispatcher 435 overrides the out of bounds address by setting the address to 0x0 before proceeding to step 620. Otherwise, in step 650 dispatcher 435 determines that the command is a store command, and in step 652 dispatcher 435 ignores the store command and proceeds to step 620.

In step 660 controller 415 determines if execution of a thread has timed out. A thread is considered to have timed out when at least one thread is running and no new threads have been launched for a certain number of clock cycles. A timed out thread is an error event since the thread is assumed to be no longer executing properly. If, in step 660 controller 415 determines that one or more threads have timed out, then in step 665 controller 415 terminates the timed out threads by overriding all subsequent instruction fetches using an "end of shader" (EOS) instruction. The EOS instruction mimics normal thread termination actions, such as the deallocation of resources, e.g., execution stack 455 and registers in LRF 304, that were allocated to the thread. In order to continue processing the terminated threads are reported to have ended normally and controller 415 proceeds to step 620.

In step 670 controller 415 determines if a stack error has occurred, and if so, in step 672 controller 415 determines if the stack error resulted from a push operation. If a push operation is performed on a full stack, then an error event results, and in step 675 controller 675 ignores the push operation in order to continue processing and proceeds to step 620. If, in step 672 controller 415 determines that the stack error did not result from a push operation, then the error event resulted from a pop operation, and in step 685 controller 415 proceeds to step 665 to terminate the thread. An event error occurs from the result of a pop operation when there are no entries on the stack to be popped. In some embodiments of the present invention, an event error is signaled when a return command is executed and execution stack 455 is empty. In other embodiments of the present invention, programmers rely on receiving data of 0x0 when a return command is executed and execution stack 455 is empty (controlled according to a configuration setting) and controller 415 is configured to disregard this condition as an error event. Similarly, other stack popping operations, e.g., BRK (break) and S (synchronization pop), may be errors that cause the thread to terminate or may result in a different action that is controlled by a configuration setting.

In step 680 dispatcher 435 determines if a register address for LRF 304 is not a valid address for the thread, and, if so, in step 685 dispatcher 435 overrides the register read and returns 0x0 data before proceeding to step 620. Otherwise, in step 690 dispatcher 435 or controller 415 takes other evasive action when an error event occurs and then proceeds to step 620 in order to continue processing. For example, an invalid operand that is misaligned may be overridden to allow PPU 202 to continue processing or an invalid register write is discarded.

The soldier-on mode may be disabled to allow developers to debug error events during product development and then enabled to allow PPU 202 to continue processing by taking evasive actions to ignore error events in production systems. From an end user's point of view, they may notice an error that manifests as a small number of incorrect pixel values in a displayed image for a single frame, but the application is allowed to continue running. This behavior is more desirable than stopping the application. Whether or not the soldier-on mode is enabled, error state information for the first error event is captured for later analysis.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for controlling error handling behavior of a processing unit within a system, comprising:
  capturing error state information of the processing unit in an error information register, wherein the capturing is triggered by an error event signal indicating that a programming error has been detected by the processing unit;
  determining if a soldier-on mode is enabled for the processing unit;
  taking evasive action, based on the error state information, to override at least one value causing the programming error in order to recover from the programming error and allow execution of a program to continue when the soldier-on mode is enabled; and
  stopping execution of the program and asserting an interrupt to indicate that the error event has been detected by the processing unit when the soldier-on mode is not enabled.

2. The method of claim 1, wherein the error event results from an invalid operand and the evasive action comprises setting the invalid operand to a predetermined value.

3. The method of claim 1, wherein the error event results from an illegal command and the evasive action comprises setting the illegal command to a no operation (NOP) command.

4. The method of claim 1, wherein the error event results from an out of bounds memory address specified for a load command and the evasive action comprises setting the memory address to zero.

5. The method of claim 1, wherein the error event results from an out of bounds memory address specified for a store command and the evasive action comprises ignoring the store command.

6. The method of claim 1, further comprising the step of reading the error information register to obtain error state information corresponding to the error event in order to facilitate debugging of the programming error.

7. The method of claim 1, wherein the processing unit is a multithreaded graphics processor configured to process graphics data and produce images suitable for display.

8. The method of claim 1, wherein the error event results from a thread timing out and the evasive action comprises terminating the thread and deallocating resources allocated to the thread.

9. The method of claim 1, wherein the error event results from a stack push at a first stack when the first stack is full and the evasive action comprises ignoring the stack push.

10. The method of claim 1, wherein the error event results from a stack pop at a first stack when the first stack is empty and the evasive action comprises terminating a thread and deallocating resources allocated to the thread.

11. The method of claim 1, wherein the error event results from an invalid register read and the evasive action comprises returning a predetermined value as data.

12. A computing device configured to execute programs, the computing device comprising:
  a front end monitoring unit including an error reporting unit configured to receive an error event signal and output an interrupt when a soldier-on mode is not enabled; and
  a processing unit coupled to the front end monitoring unit and configured to:
  capture error state information in an error information register, wherein the capturing is triggered by the error event signal indicating that a programming error has been detected by the processing unit;
  determine if the soldier-on mode is enabled for the processing unit;
  take evasive action, based on the error state information, to override at least one value causing the programming error in order to recover from the programming error and allow execution of a program to continue when the soldier-on mode is enabled; and
  stop execution of the program when the soldier-on mode is not enabled.

13. The system of claim 12, wherein the error event results from an invalid operand and the evasive action comprises setting the invalid operand to a predetermined value.

14. The system of claim 12, wherein the error event results from an illegal command and the evasive action comprises setting the illegal command to a no operation (NOP) command.

15. The system of claim 12, wherein the error event results from an out of bounds memory address specified for a load command and the evasive action comprises setting the memory address to zero.

16. The system of claim 12, wherein the error event results from an out of bounds memory address specified for a store command and the evasive action comprises ignoring the store command.

17. The system of claim 12, further comprising a host interface that is coupled to the front end monitoring unit and the processing unit, and configured to read the error information register in order to facilitate debugging of the programming error.

18. The system of claim 12, wherein the error event results from a thread timing out and the evasive action comprises terminating the thread and deallocating resources allocated to the thread.

19. The system of claim 12, wherein the processing unit is further configured to concurrently process data for multiple threads.

20. The system of claim 12, further comprising lower-level error reporting units and lower-level error information registers configured in a daisy-chain that is coupled to the error information register in order to summarize error events to the error reporting unit.

* * * * *